United States Patent
Guo et al.

(10) Patent No.: US 11,090,772 B2
(45) Date of Patent: Aug. 17, 2021

(54) METHOD AND APPARATUS FOR MACHINING PARTS WITH VARIABLE STIFFNESS

(71) Applicant: United Technologies Corporation, Farmington, CT (US)

(72) Inventors: Changsheng Guo, South Windsor, CT (US); Zhigang Wang, South Windsor, CT (US); Eric Fromerth, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 287 days.

(21) Appl. No.: 16/238,167

(22) Filed: Jan. 2, 2019

(65) Prior Publication Data

US 2020/0206851 A1   Jul. 2, 2020

(51) Int. Cl.
*B23P 15/02*    (2006.01)
*B23C 3/18*    (2006.01)

(52) U.S. Cl.
CPC ............... *B23P 15/02* (2013.01); *B23C 3/18* (2013.01)

(58) Field of Classification Search
CPC . B23P 15/02; B23C 3/18; G05B 2219/36252; G05B 2219/35009; G05B 2219/41256; G05B 2219/37434; G05B 19/40937
See application file for complete search history.

(56) References Cited

U.S. PATENT DOCUMENTS

| | | | |
|---|---|---|---|
| 4,707,793 A | 11/1987 | Anderson | |
| 4,833,617 A | 5/1989 | Wang | |
| 7,540,697 B2 | 6/2009 | Wang et al. | |
| 7,933,679 B1 | 4/2011 | Kulkarni et al. | |
| 8,689,442 B2 | 4/2014 | Kappmeyer et al. | |
| 8,788,083 B2 | 7/2014 | Atabey | |
| 9,703,281 B2 | 7/2017 | Shamoto | |
| 9,892,215 B2 | 2/2018 | Erdim et al. | |

(Continued)

FOREIGN PATENT DOCUMENTS

JP   2016162149 A   9/2016

OTHER PUBLICATIONS

Mane et al, "Stability-based Spindle Speed Control during Flexible Workpiece High-Speed Milling—ScienceDirect" International Journal of Machine Tools and Manufacture vol. 48, Issue 2 Feb. 2008, pp. 184-194.

(Continued)

*Primary Examiner* — Moshe Wilensky
(74) *Attorney, Agent, or Firm* — Linney & Lange, P.A.

(57) ABSTRACT

A method and apparatus for machining parts with variable stiffness includes determining, by a controller, a chatter-lobe plot of a cutter assembly. A preliminary tool path is developed by the controller. Virtual machining of a blank part using the preliminary tool path is performed by the controller. A chatter-lobe plot of the virtually machined part is determined by the controller. A dynamic chatter-lobe plot using the chatter-lobe plot of the cutting tool assembly and the chatter-lobe plot of the virtually machined part is determined by the controller. A chatter-free rotational speed of the cutting tool from the dynamic chatter-lobe plot is determined by the controller. A machining apparatus, controlled by the controller, uses the determined chatter-free rotational speed of the cutting tool to machine a blank part.

10 Claims, 5 Drawing Sheets

(56) References Cited

U.S. PATENT DOCUMENTS 9,989,957 B2 6/2018 Kurosumi
2018/0130489 A1 5/2018 Cheng et al.

OTHER PUBLICATIONS

Prabhu Raja V et al, "Stability Lobe Diagram for High Speed Machining Processes:Comparison of Experimental and Analytical Methods—A Review" International Journal of Innovative Research in Science, Engineering and Technology, vol. 2, Issue 3, Mar. 2013.
Extended European Search Report for EP Application No. 19218792.0, dated May 14, 2020, pp. 10.

METHOD AND APPARATUS FOR MACHINING PARTS WITH VARIABLE STIFFNESS

BACKGROUND

Chatter is undesirable frequency oscillations or vibrations between a workpiece and a cutting tool during the machining process. Vibration problems may result in excessive noise, bad surface quality of the workpiece, and sometimes tool breakage. As such, avoiding chatter during the machining process is critical for meeting the stringent part quality requirements in the aerospace industry and for maximizing tool life. For the machining of rigid parts empirical analyses, such as the tap test method, work well. However, for flexible parts, such as airfoils, the rigidity of the part varies depending where on the part the machining process will be applied. Additionally, the rigidity of the part may change significantly as material is removed during the machining process. This variability in the rigidity of the part results in a corresponding change in the machining vibration profile.

SUMMARY

A method for machining parts with variable stiffness includes determining, by a controller, a chatter-lobe plot of a cutter assembly. A preliminary tool path is developed by the controller. Virtual machining of a virtual blank part using the preliminary tool path is performed by the controller. A chatter-lobe plot of the virtually machined part is determined by the controller. A dynamic chatter-lobe plot using the chatter-lobe plot of the cutting tool assembly and the chatter-lobe plot of the virtually machined part is determined by the controller. A chatter-free rotational speed of the cutting tool from the dynamic chatter-lobe plot is determined by the controller based upon an analysis of the vibrational profile when the depth of the cut is plotted versus the rotational speed of the cutting tool. A machining apparatus, controlled by the controller, uses the determined chatter-free rotational speed of the cutting tool to machine a blank part.

The machining apparatus includes a cutting tool assembly for machining blank parts and a controller that provides cutting tool movement and rotational speed commands to the machining apparatus. The controller includes computer-readable memory encoded with instructions that, when executed by the controller, cause the controller to perform a method for machining parts, which includes determining a chatter-lobe plot of a cutting tool assembly. A preliminary tool path is developed. Virtual machining of a virtual model of a blank part using the preliminary tool path to produce a virtually machined blank part is performed. A chatter-lobe plot of the virtually machined blank part is determined. A dynamic chatter-lobe plot using the chatter-lobe plot of the cutting tool assembly and the chatter-lobe plot of the virtually machined blank part is determined. A chatter-free rotational speed profile of the cutting tool from the dynamic chatter-lobe plot is determined. A machining apparatus to use the determined chatter-free rotational speed profile of the cutting tool to machine the blank part is controlled.

DETAILED DESCRIPTION

The present disclosure relates generally to a chatter-free machining process and apparatus. More specifically, this disclosure relates to a chatter-free machining process and apparatus for flexible parts or parts whose stiffness varies during the machining process.

Thin-walled components in an aircraft, such as an airfoil, blade, or structural guide vane are relatively flexible. This flexibility may change significantly as material is removed from a blank airfoil during a machining process. Additionally, the airfoil may be more flexible in one region than another. Frequently, for example, the tip of a blade tends to be much more flexible than the root of the blade.

Figure 1:
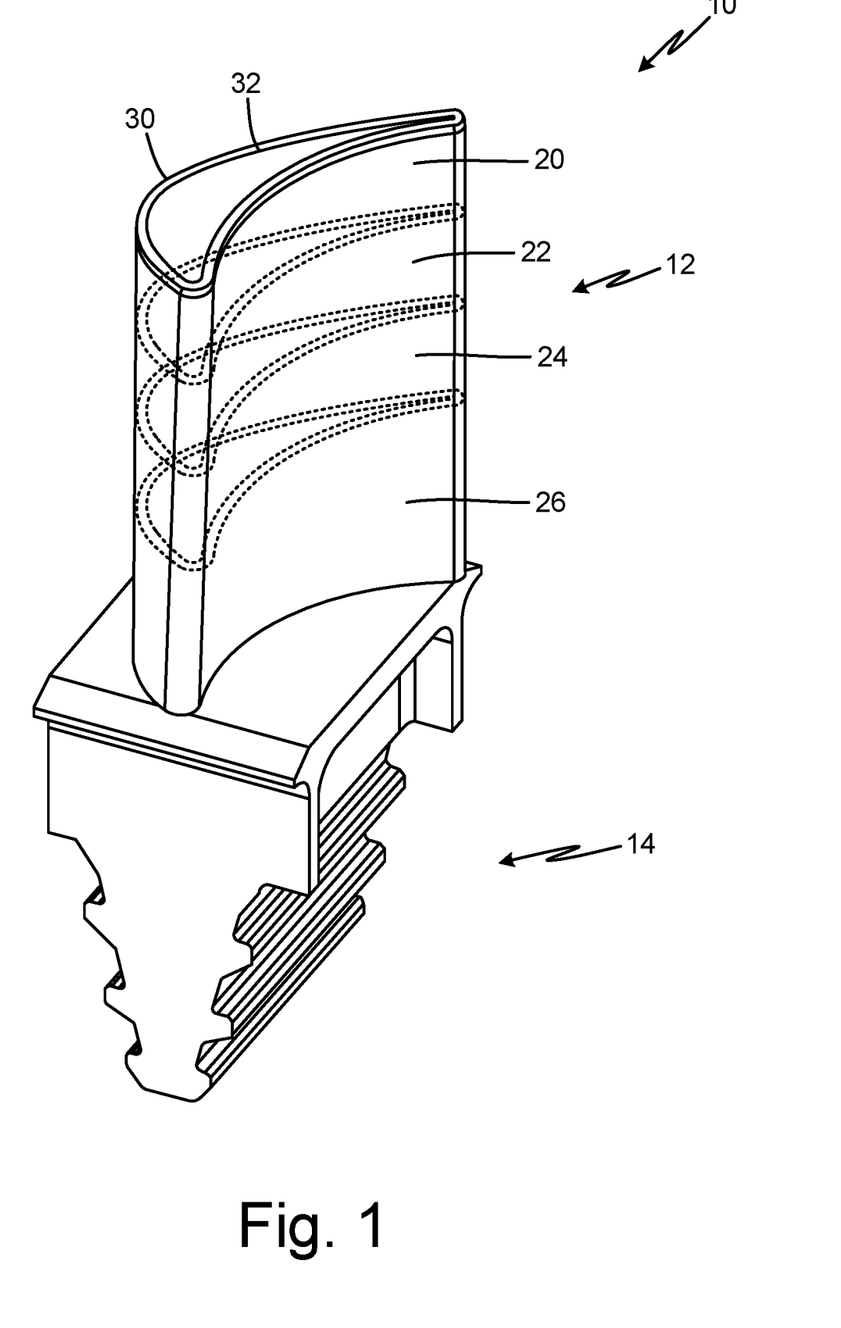
FIG. 1 is a perspective view of a blank airfoil.

FIG. 1 is a perspective view of a blank airfoil. FIG. 1 shows airfoil 10, airfoil blade 12, airfoil root 14, first segment 20, second segment 22, third segment 24, fourth segment 26, initial outer wall 30, and machined outer wall 32. Airfoil 10 is a blank airfoil with airfoil blade 12 and airfoil root 14. Airfoil blade 12 requires machining to match a desired geometry which may impart desired operational characteristics within an aircraft engine. A machining process can begin by machining first segment 20, then proceed to machine second segment 22, then machine third segment 24 and fourth segment 26. Initial outer wall 30 of airfoil blade 12 represents the outer surface of blank airfoil blade 12 before it has been machined. Machined outer wall 32 represents the outer surface of finished airfoil blade 12 after airfoil blade 12 has been machined.

Frequently, airfoil root 14 is clamped to a support structure so that airfoil 10 does not move relative to a cutting tool during the machining process. Nonetheless, airfoil 10 may vibrate during the machining process. The vibrations may be more acute near the tip of first segment 20 of airfoil blade 12. The machining parameters necessary to minimize vibrations during machining of first segment 20 may be different than the machining parameters used when machining second segment 22, which may be different than the machining parameters used when machining third segment 24 or fourth segment 26.

Machining parameters include, for example, the depth of the cut to be machined, the rotational speed at which the cutting tool spins, a tool path across the blank part, and choice of cutting tool assembly, which includes a spindle, holder, and cutting tool. Each spindle, holder, and cutting tool combination may have a unique dynamics profile. For each combination the depth of the cut and the rotational speed of the cutting tool may be optimized.

Figure 2:
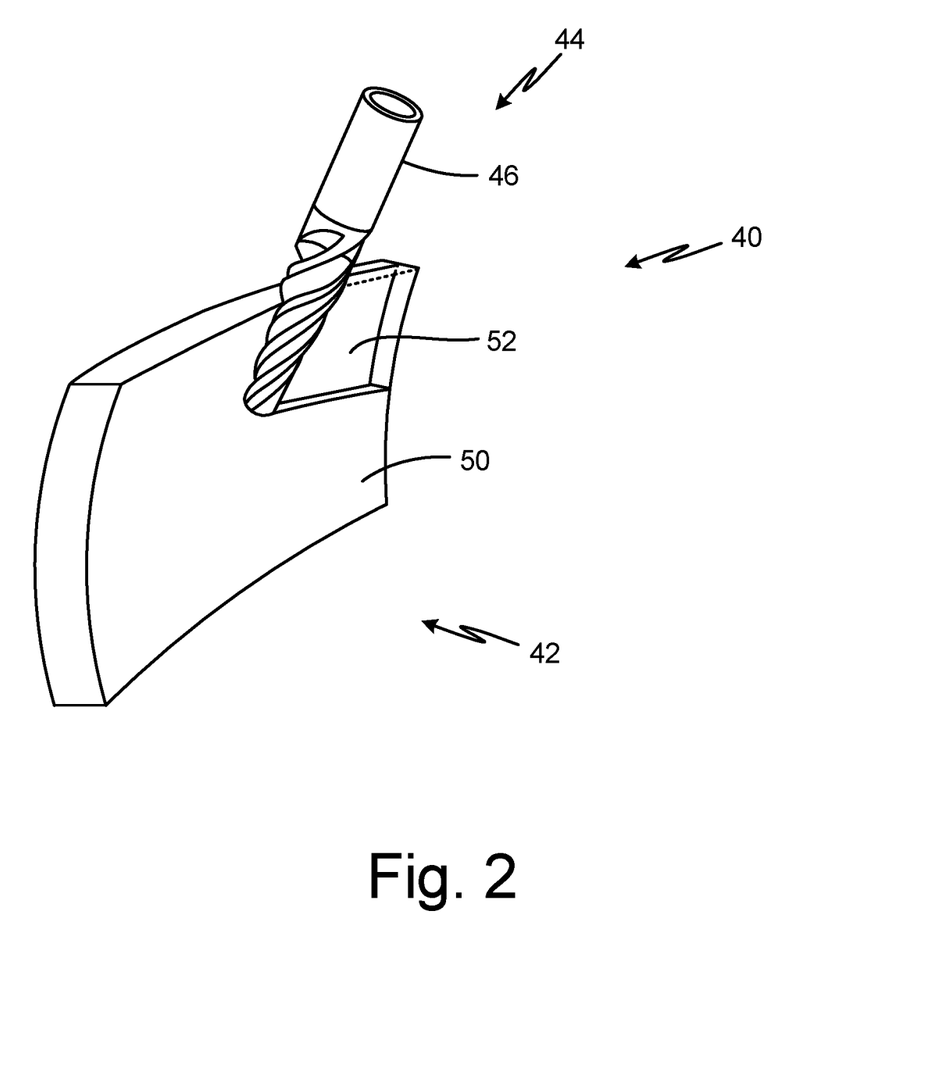
FIG. 2 is a perspective view of a blank airfoil in the process of being machined by a cutting tool.

FIG. 2 is a perspective view of a blank airfoil in the process of being machined by a cutting tool. FIG. 2 shows machining apparatus 40, blank airfoil 42, cutting assembly 44, cutting tool 46, initial outer surface 50, and machined outer surface 52. Machining apparatus 40 machines blank airfoil 42 using cutting tool assembly 44. Blank airfoil 42 can be any thin-walled or otherwise flexible part which requires machining. Cutting assembly 44 includes cutting tool 46, which is depicted as a tapered ball-end mill in FIG. 2, but that can be any cutting tool used during the machining process of a part. Initial outer surface 50 of blank airfoil 42 represents the portion of the surface of blank airfoil 42 needing to be removed by the machining process. Machined outer surface 52 of blank airfoil 42 represents the portion of the surface of airfoil 42 that has already been machined.

Figure 3:
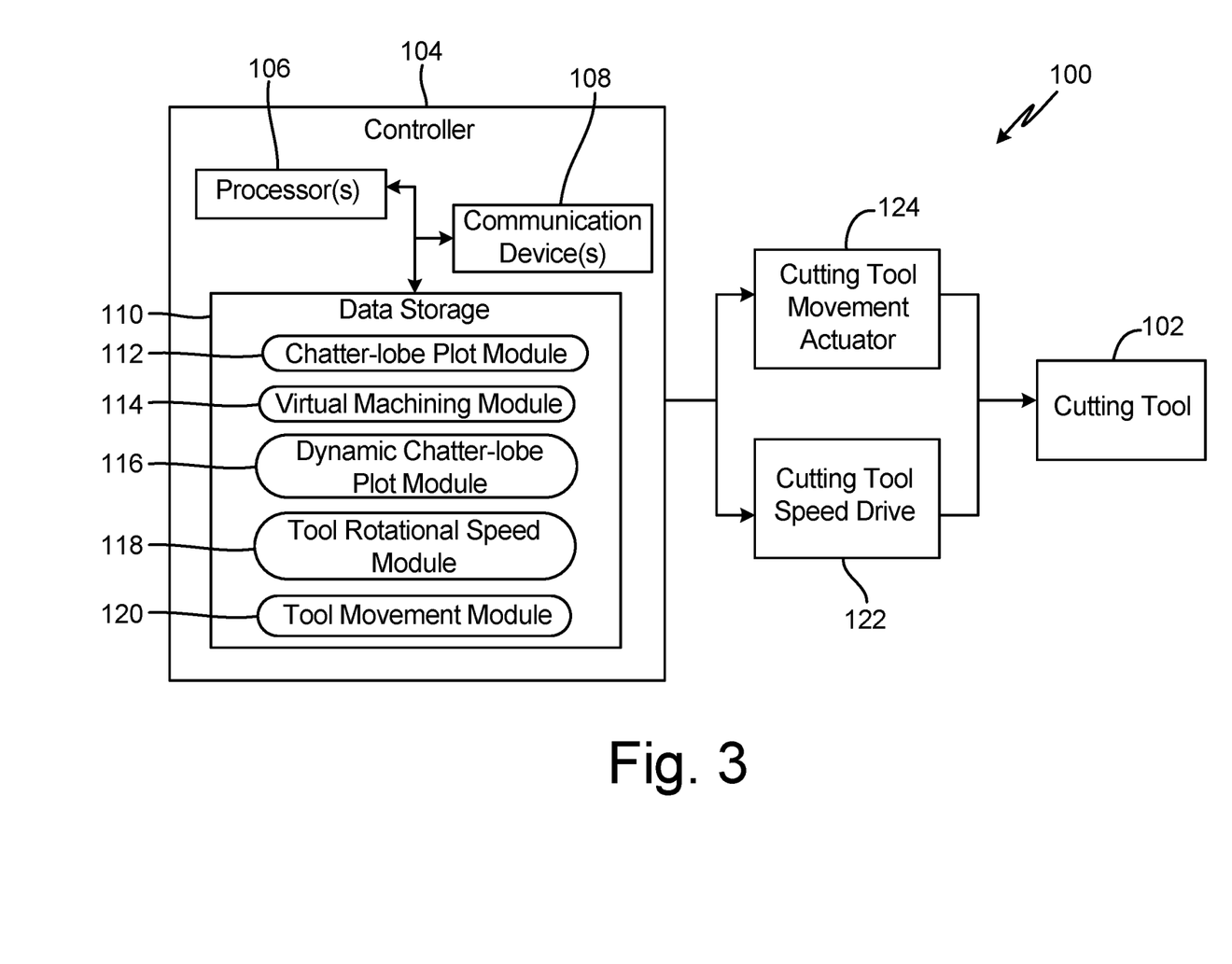
FIG. 3 is a schematic view of a machining apparatus.

FIG. 3 is a schematic view of a machining apparatus. FIG. 3 shows machining apparatus 100, cutting tool assembly 102, controller 104, processor(s) 106, communication device(s) 108, data storage 110, chatter-lobe plot module 112, virtual machining module 114, dynamic chatter-lobe plot module 116, tool rotational speed module 118, tool movement module 120, cutting tool speed drive 122, and cutting tool movement actuator 124.

Machining apparatus 100 is used to machine a workpiece or blank part (not shown is FIG. 3). Machining operations can include, for example, turning, milling, drilling, and grinding. For each machining operation a cutting tool assembly 102 is chosen by a machinist which includes a spindle, holder, and cutting tool. Each cutting tool assembly 102 will have a unique chatter-lobe plot profile. The chatter-lobe plot can be used to identify machining conditions that minimize the occurrence of vibrations during the machining process.

Controller 104 uses processor(s) 106 to determine a chatter-lobe plot of the cutting tool assembly. The underlying data used to determine the chatter-lobe plot is either obtained empirically and entered through communication devices(s) 108 or obtained from data storage 110. A machinist performs, for example, a tap test on the cutting tool assembly 102 and enters the frequency response data through communication device(s) 108 of controller 104 manually with, for example, a keyboard, mouse, or other external device.

Controller 104 can be any device capable of executing computer-readable instructions defining a software program. Controller 104, in one example, utilizes communication device(s) 108 to communicate with external devices via one or more networks, such as one or more wireless or wired networks. Communication device(s) 108 can be a network interface card, such as an Ethernet card, an optical transceiver, a radio frequency transceiver, or any other type of device that can send and receive information. Other examples of such network interfaces can include Bluetooth, 3G, 4G, and WiFi radio computing devices as well as Universal Serial Bus (USB).

Communication device(s) 108 may send the tap test data to data storage 110 of controller 104. Data storage 110 can include one or more databases. Though illustrated in FIG. 3 as integrated with controller 104, in other examples data storage 110 may be separate and communicatively coupled with controller 104. Data storage 110 stores a library of machining apparatus parameters and programs, including but not limited to chatter-lobe plot module 112, virtual machining module 114, dynamic chatter-lobe plot module 116, tool speed module 118, and tool movement module 120.

Data storage 110 can be configured to store information within controller 104 during operation. Data storage 110, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, data storage 110 is a temporary memory, meaning that a primary purpose of data storage 110 is not long-term storage. Data storage 110, in some examples, is described as volatile memory, meaning that data storage 110 does not maintain stored contents when power to controller 104 is turned off. Examples of volatile memories can include random access memories (RAM), dynamic random access memories (DRAM), static random access memories (SRAM), and other forms of volatile memories. In some examples, data storage 110 is used to store program instructions for execution by processor(s) 106. Data storage 110, in one example, is used by software or applications running on controller 104 (e.g., a software program implementing architecture 10) to temporarily store information during program execution.

Data storage 110, in some examples, also includes one or more computer-readable storage media. Data storage 110 can be configured to store larger amounts of information than volatile memory. Data storage 110 can further be configured for long-term storage of information. In some examples, data storage 110 includes non-volatile storage elements. Examples of such non-volatile storage elements can include magnetic hard discs, optical discs, flash memories, or forms of electrically programmable memories (EPROM) or electrically erasable and programmable (EEPROM) memories.

For rigid parts, processor(s) 106 of controller 104 uses the empirically entered data by the machinist through communication device(s) 108 or uses stored data in data storage 110 of controller 104 to input into chatter-lobe plot module 112 of data storage 110 which then can plot a stability curve based upon the depth of the cut and the rotational speed of the cutting tool and determine where vibrations due to the machining process are minimized for cutting tool assembly 102. Virtual machining module 114 and dynamic chatter-lobe plot module 116 of data storage 110 in FIG. 3 are discussed below in combination with FIG. 4. The optimized machining parameters can then be sent through communication device(s) 108 to, for example, cutting tool speed drive 122 and cutting tool movement actuator 124. Processor(s) 106 uses tool rotational speed module 118 of data storage 110 to send the determined rotational speed of the cutting tool, where vibrations are minimized, to cutting tool speed drive 122. Processor(s) 106 uses tool movement module 120 of data storage 110 to determine an optimized tool path and send the NC (numeric control) instructions to cutting tool movement actuator 124.

Processor(s) 106, in one example, is configured to implement functionality and/or process instructions for execution within controller 104. For instance, processor(s) 106 can be capable of processing instructions stored in data storage 110. Examples of processor(s) 106 can include any one or more of a microprocessor, a controller, a digital signal processor (DSP), an application specific integrated circuit (ASIC), a field-programmable gate array (FPGA), or other equivalent discrete or integrated logic circuitry.

As illustrated in FIG. 3, controller 104 can include processor(s) 106, communication device(s) 108, and data storage 110. However, in certain examples, controller 104 can include more or fewer components than communication device(s) 108, processor(s) 106, and data storage 110.

Figure 4:
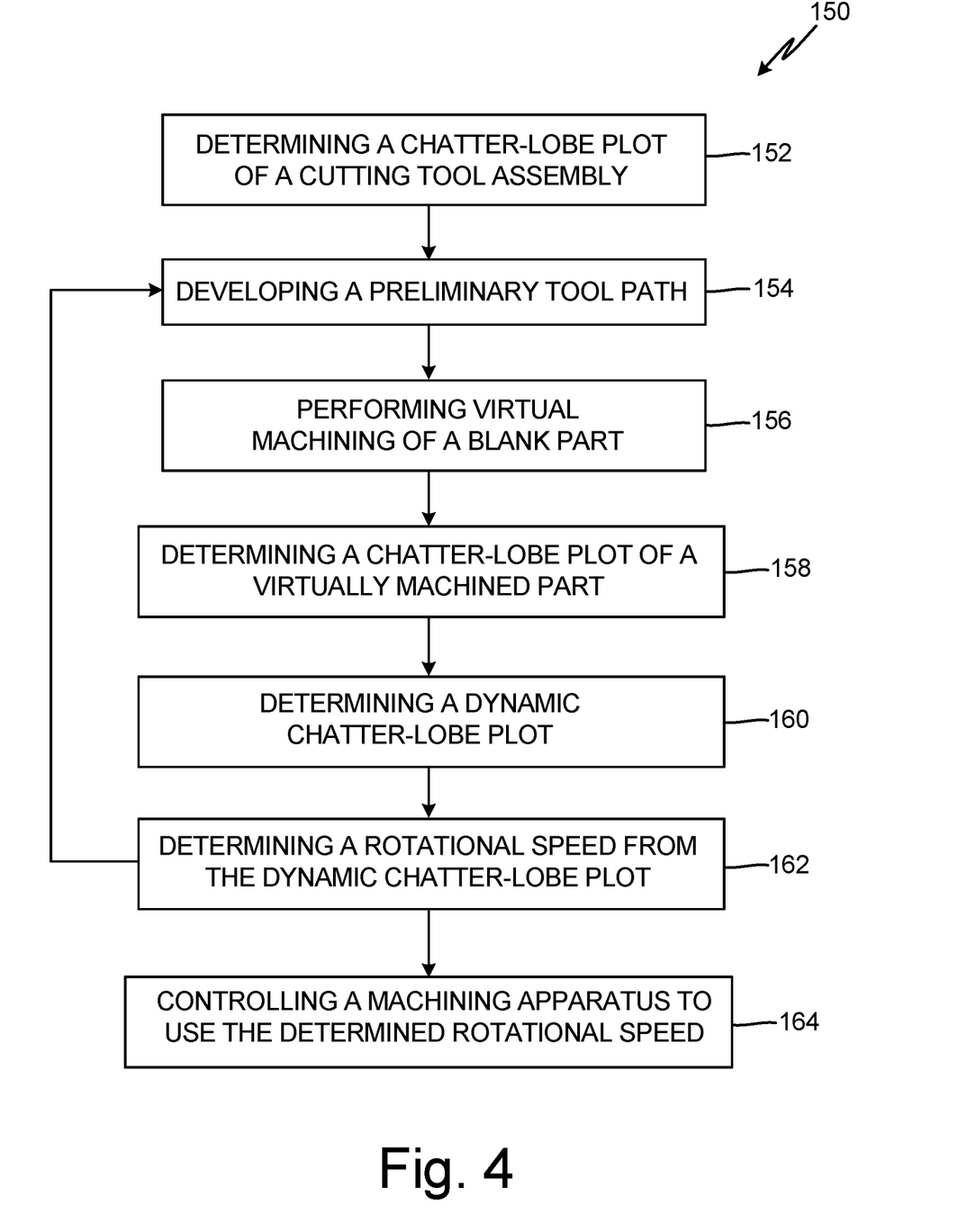
FIG. 4 is a flow chart for determining a chatter-free machining process of a flexible part.

For flexible parts, as shown in FIG. 4, chatter-free machining process 150 can be implemented. FIG. 4 is a flow chart for determining a chatter-free machining process for a flexible part. FIG. 4 shows chatter-free machining method 150 which includes determining a chatter-lobe plot of a cutter assembly 152, developing a preliminary tool path 154, performing virtual machining of a blank part 156, determining a chatter-lobe plot of a modelled semi-finished part 158, determining a dynamic chatter-lobe plot 160, determining a rotation speed from the dynamic chatter-lobe plot 162, and controlling a machining apparatus to use the determined tool speed 164.

Process 150 begins with step 152, which can use machining apparatus 100 shown in FIG. 3 and includes a machinist choosing a spindle, holder, and a cutting tool for cutting tool assembly 102. A machinist can then perform a tap test on cutting tool assembly 102. Step 152 further includes processor(s) 106 of controller 104 using the empirically entered data by the machinist through communication device(s) 108 or using stored data in data storage 110 of controller 104 to input the data into chatter-lobe plot module 112 of data storage 110 which then generates the chatter-lobe plot and determines where vibrations due to the machining process are minimized for cutting tool assembly 102. Alternatively, the chatter-lobe plot of cutting tool assembly 102 can be determined by performing modal analysis on cutting tool assembly 102 using CAM (computer-aided manufacturing) software. Processor(s) 106 sends the generated chatter-lobe plot for the cutting tool assembly 102 to data storage 110 for later use.

Step 154 includes developing a preliminary tool path using CAM software.

Processor(s) 106 retrieves the geometry and material data of the blank part from data storage 110. Processor(s) 106 then uses CAM software of data storage 110 to create the preliminary tool path, which is then sent by processor(s) 106 to data storage 110 for later use.

Step 156 includes performing virtual machining on a virtual blank part. Processor(s) 106 uses virtual machining module 114 of data storage 110 to complete the virtual machining of the virtual blank part. Processor(s) 106 then performs modal analysis on the virtually machined part using FE (finite element) software from data storage 110. The FE software can predict the physical cutting forces occurring during the machining process using metal cutting theory and estimate the dynamics of the changing workpiece using Euler-Bernoulli beam theory. Processor(s) 106 sends the modal analysis results to data storage 110 for later use.

Step 158 includes determining the chatter-lobe plot of the virtually machined blank part. Processor(s) 106 uses chatter-lobe plot module 112 and the modal analysis results of data storage 110 to generate the chatter-lobe plot of the virtually machined blank part. Processor(s) 106 sends the generated chatter-lobe plot of the virtually machined part to data storage 110 for later use.

Step 160 includes determining a dynamic chatter-lobe plot. Processor(s) 106 uses, from data storage 110, the chatter-lobe plot of cutting tool assembly 102, the modal analysis results, the chatter-lobe plot of the virtually machined blank part, and dynamic chatter-lobe plot module 116. The dynamic chatter-lobe plot may be further optimized by repeating steps 154, 156, 158, and 160 in an iterative process. Alternatively or in combination with optimization, steps 154, 156, 158, and 160 may be repeated for each segment of a blank part.

Step 162 includes obtaining optimized machining parameters from the dynamic chatter-lobe plot. Processor(s) 106 can determined a set of optimized machining parameters from the dynamic chatter-lobe plot. Optimized machining parameters include, for example, the depth of cut and a cutting tool rotational speed.

Step 164 includes controlling machining apparatus 100 using the optimized machining parameters. Processor(s) 106 uses tool rotational speed module 118 to send the optimized cutting tool rotational speed through communication device(s) 108 to cutting tool speed drive 122. Processor(s) 106 uses tool movement module 120 to send the optimized tool path through communication device(s) 108 to cutting tool movement actuator 124.

Figure 5:
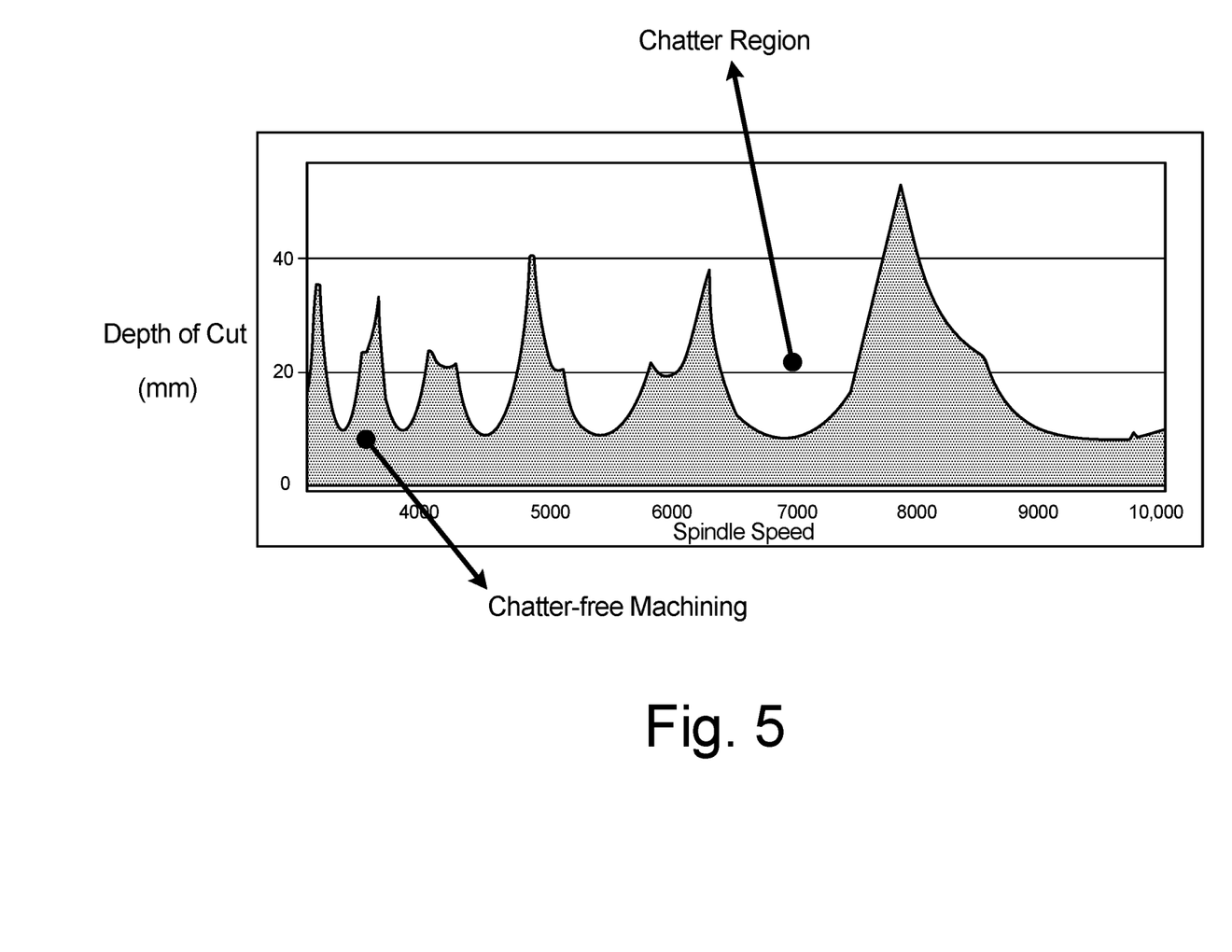
FIG. 5 is a dynamic chatter-lobe plot.

FIG. 5 shows an example of a dynamic chatter-lobe plot. Depth of cut is plotted on the y-axis as a function of the rotational speed of the cutting tool on the x-axis. Shaded areas indicate regions where vibrations are predicted to be minimized and result in chatter-free machining. Non-shaded regions indicate regions where vibrations detrimental to the machining process are expected to occur.

Using modal analysis and CAM software obviates the need for laborious and time-consuming empirical data collection techniques, such as the tap test, for determining machining parameters which minimize the occurrence of vibrations during the machining process. This amounts to considerable time and cost savings when applied to flexible parts which otherwise may require the collection of vibration data for many segments of each part. Furthermore, using modal analysis and CAM software obviates the collection of vibration data which may need to be frequently repeated as material is removed during the machining process because the part's flexibility is dynamically changing as that material is removed.

Discussion of Possible Embodiments

The following are non-exclusive descriptions of possible embodiments of the present invention.

A machining method includes determining, by a controller, a chatter-lobe plot of a cutting tool assembly; developing, by the controller, a preliminary tool path; performing, by the controller, virtual machining of a virtual model of a blank part using the preliminary tool path to produce a virtually machined blank part; determining, by the controller, a chatter-lobe plot of the virtually machined blank part; determining, by the controller, a dynamic chatter-lobe plot using the chatter-lobe plot of the cutting tool assembly and the chatter-lobe plot of the virtually machined blank part; determining, by the controller a chatter-free rotational speed profile of the cutting tool from the dynamic chatter-lobe plot; and controlling, by the controller, a machining apparatus to use the determined chatter-free rotational speed profile of the cutting tool to machine the blank part.

The method of the preceding paragraph can optionally include, additionally and/or alternatively, any one or more of the following:

The chatter-lobe plot of the cutter assembly is determined by the controller using data generated through a tap test method.

The chatter-lobe plot of the cutter assembly is determined by the controller through modal analysis of the cutting tool assembly.

The blank part is an airfoil.

A dynamic chatter-lobe plot is determined for a plurality of segments of the blank part.

A machining apparatus includes a cutting tool assembly for machining blank parts and a controller that provides cutting tool movement and rotational speed commands to the machining apparatus, the controller including computer-readable memory encoded with instructions that, when executed by the controller, cause the system to: determine, by a controller, a chatter-lobe plot of a cutting tool assembly; develop, by the controller, a preliminary tool path; perform, by the controller, virtual machining of a virtual model of a blank part using the preliminary tool path to produce a virtually machined blank part; determine, by the controller, a chatter-lobe plot of the virtually machined blank part; determine, by the controller, a dynamic chatter-lobe plot using the chatter-lobe plot of the cutting tool assembly and the chatter-lobe plot of the virtually machined blank part; determine, by the controller, a chatter-free rotational speed profile of the cutting tool from the dynamic chatter-lobe plot;

and control, by the controller, a machining apparatus to use the determined chatter-free rotational speed profile of the cutting tool to machine the blank part.

The apparatus of the preceding paragraph can optionally include, additionally and/or alternatively, any one or more of the following:

The chatter-lobe plot of the cutter assembly is determined by the controller using data generated through a tap test method.

The chatter-lobe plot of the cutter assembly is determined by the controller through modal analysis of the cutting tool assembly.

The blank part is an airfoil.

A dynamic chatter-lobe plot is determined for a plurality of segments of the blank part.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A machining method comprising:
   determining, by a controller, a chatter-lobe plot of a cutting tool assembly based on data about the cutting tool assembly;
   developing, by the controller, a preliminary tool path based on geometry and material data for a blank part;
   performing, by the controller, virtual machining of a virtual model of a virtual blank part using the preliminary tool path to produce a virtually machined blank part;
   determining, by the controller, a chatter-lobe plot of the virtually machined blank part;
   determining, by the controller, a dynamic chatter-lobe plot using the chatter-lobe plot of the cutting tool assembly and the chatter-lobe plot of the virtually machined blank part;
   determining, by the controller, optimized machining parameters, including a chatter-free rotational speed profile of the cutting tool assembly, from the dynamic chatter-lobe plot; and
   controlling, by the controller, a machining apparatus to use the determined optimized machining parameters, including the chatter-free rotational speed profile of the cutting tool assembly, to machine the blank part, wherein machining the blank part changes the rigidity of the blank part due to material removal.

2. The method of claim 1, wherein the chatter-lobe plot of the cutting tool assembly is determined by the controller using data generated through a tap test method.

3. The method of claim 1, wherein the chatter-lobe plot of the cutting tool assembly is determined by the controller through modal analysis of the cutting tool assembly.

4. The method of claim 1, wherein the blank part is an airfoil.

5. The method of claim 1, wherein a dynamic chatter-lobe plot is determined for each of a plurality of segments of the blank part.

6. A machining apparatus comprising:
   a cutting tool assembly for machining blank parts; and
   a controller that provides cutting tool movement and rotational speed commands to the machining apparatus, the controller including computer-readable memory encoded with instructions that, when executed by the controller, cause the controller to:
   determine a chatter-lobe plot of the cutting tool assembly based on data about the cutting tool assembly;
   develop a preliminary tool path based on geometry and material data for a blank part;
   perform virtual machining of a virtual model of a virtual blank part using the preliminary tool path to produce a virtually machined blank part;
   determine a chatter-lobe plot of the virtually machined blank part;
   determine a dynamic chatter-lobe plot using the chatter-lobe plot of the cutting tool assembly and the chatter-lobe plot of the virtually machined blank part;
   determine optimized machining parameters, including a chatter-free rotational speed profile of the cutting tool assembly, from the dynamic chatter-lobe plot; and
   control the machining apparatus to use the determined optimized machining parameters, including the chatter-free rotational speed profile of the cutting tool assembly, to machine the blank part, wherein machining the blank part changes the rigidity of the blank part due to material removal.

7. The apparatus of claim 6, wherein the chatter-lobe plot of the cutting tool assembly is determined by the controller using data generated through a tap test method.

8. The apparatus of claim 6, wherein the chatter-lobe plot of the cutting tool assembly is determined by the controller through modal analysis of the cutting tool assembly.

9. The apparatus of claim 6, wherein the blank part is an airfoil.

10. The apparatus of claim 6, wherein a dynamic chatter-lobe plot is determined for each of a plurality of segments of the blank part.

* * * * *